(12) United States Patent
Mikich et al.

(10) Patent No.: US 10,962,800 B1
(45) Date of Patent: Mar. 30, 2021

(54) RECONFIGURABLE EYEWEAR SYSTEM

(71) Applicants: Joseph Mikich, Milwaukee, WI (US); Dick A. Kaquatosh, Jr., Milwaukee, WI (US); Joseph Minella, Elkton, FL (US)

(72) Inventors: Joseph Mikich, Milwaukee, WI (US); Dick A. Kaquatosh, Jr., Milwaukee, WI (US); Joseph Minella, Elkton, FL (US)

( * ) Notice: Subject to any disclaimer, the term of this patent is extended or adjusted under 35 U.S.C. 154(b) by 97 days.

(21) Appl. No.: 16/255,791

(22) Filed: Jan. 23, 2019

Related U.S. Application Data

(60) Provisional application No. 62/623,744, filed on Jan. 30, 2018.

(51) Int. Cl.
| | |
|---|---|
| *G02C 5/02* | (2006.01) |
| *G02C 5/12* | (2006.01) |
| *G02C 5/14* | (2006.01) |
| *G02C 11/02* | (2006.01) |

(52) U.S. Cl.
CPC ............. *G02C 5/02* (2013.01); *G02C 5/12* (2013.01); *G02C 5/14* (2013.01); *G02C 11/02* (2013.01); *G02C 2200/02* (2013.01); *G02C 2200/08* (2013.01)

(58) Field of Classification Search
CPC ... G02C 1/04; G02C 1/06; G02C 1/08; G02C 2200/06; G02C 9/04; G02C 5/02
USPC ............... 351/90, 92, 96–102, 51, 52
See application file for complete search history.

(56) References Cited

U.S. PATENT DOCUMENTS

| | | | | |
|---|---|---|---|---|
| 8,992,007 | B2* | 3/2015 | Li | G02C 5/04 351/57 |
| 2003/0223032 | A1* | 12/2003 | Gagnon | A45C 11/04 351/92 |
| 2012/0075571 | A1* | 3/2012 | Silver | G02C 11/02 351/52 |

* cited by examiner

*Primary Examiner* — Hung X Dang
(74) *Attorney, Agent, or Firm* — QuickPatents, LLC; Kevin Prince

(57) ABSTRACT

An eyewear system for supporting lenses in front of a person's eyes includes a resilient or malleable frame having two opposing ends each fixed with a lower frame and an upper frame that each include two rims mutually affixed at a central bridge. The frame further includes two elongated temples that project rearwardly away from the frame, and two nose pad mounts with nose pads that each projects rearwardly away from one of the lower rims. As such, with the lenses each engaged with the rims, the lower rims and the upper rims sandwich and retain the lenses therebetween. A bridge coupler attaches with the upper bridge and the lower bridge to lock together the relative position of the upper bridge and the lower bridge to retain the lenses within the frame. Interchangeable parts can attach to the nose pad mounts, frame and temples to provide a unique appearance.

16 Claims, 4 Drawing Sheets

RECONFIGURABLE EYEWEAR SYSTEM

CROSS-REFERENCE TO RELATED APPLICATIONS

This application claims the benefit of U.S. Provisional Patent Application 62/623,744, filed on Jan. 30, 2018, and incorporated herein by reference.

STATEMENT REGARDING FEDERALLY SPONSORED RESEARCH AND DEVELOPMENT

Not Applicable.

FIELD OF THE INVENTION

This invention relates to eyewear, and more particularly to eyewear with reconfigurable elements.

BACKGROUND

Eyewear for correcting vision or shielding the eyes from glare are well known, and many styles and types of frames and lenses exist in the prior art. Custom prescription lenses to correct eyesight are expensive and once a set of frames for the lenses are selected it is difficult or impossible to change the frames, which is often desired to match one's particular outfit or just to alter the person's look somewhat periodically. Further, with prior art frames it is difficult to change the various pieces without tools.

Therefore, there is a need for eyewear that allows the user to change the look of the frames periodically with interchangeable parts having a different look. Such a needed invention would allow the user to swap-out pieces without the need for tools, and would further allow for use with custom prescription lenses as well as tinted lenses to reduce glare. Such a needed system would be relatively inexpensive to manufacture and intuitive to use. The present invention accomplishes these objectives.

SUMMARY OF THE INVENTION

The present device is an eyewear system for supporting two or four lenses in front of the eyes of a person. A frame has two opposing ends that are each fixed with a lower frame and an upper frame. Each lower frame includes two lower rims mutually affixed at a central lower bridge. Each upper frame, similarly, includes two upper rims mutually affixed at a central upper bridge. A gap is defined between the upper bridge and the lower bridge that allows the upper bridge and the lower bridge to move mutually towards or away from each other. The frame further includes two elongated temples, each of which projects rearwardly away from a rear side of the frame at one of the opposing ends of the frame.

The frame further includes two nose pad mounts, each of which projects rearwardly away from one of the lower rims proximate the lower bridge. Preferably the frame, temples, and nose pad mounts are all integrally formed from a substantially rigid material, such as stainless steel.

As such, with the lenses each engaged with one of the lower rims and a corresponding one of the upper rims, the lower rims and the upper rims sandwich and retain the lenses therebetween. In some embodiments the secondary lenses may also be captured by the upper rims and the lower rims along with the lenses.

A bridge coupler is adapted for selective manual attachment with at least the upper bridge and the lower bridge, such that when attached thereto the relative position of the upper bridge and the lower bridge are locked together, thereby maintaining retention of the lenses within the frame. As such, the frame can be worn by the person on his nose and ears to hold the lenses in front of his eyes, as with conventional spectacles.

The upper bridge and the lower bridge each preferably include a first part of a two-part fastener. The bridge coupler, in such an embodiment, includes two second parts of the two-part fastener. The first part and the second part of the two-part fasteners are then each brought together manually to affix the bridge coupler to the upper bridge and the lower bridge.

Preferably each opposing end of the frame further includes one of the first parts of the two-part fastener, and a pair of lens brows extend in opposing directions from the bridge coupler to opposing distal ends each having one of the second parts of the two-part fastener. Each distal end of the bridge coupler with the lens brows is thereby adapted for fixing with one of the opposing ends of the frame.

Two cushioned nose pads are each adapted for contacting the person's nose and having one of the second parts of the two-part fastener. Each nose pad mount, in such an embodiment, further includes the first part of the two-part fastener, such that each nose pad may be manually affixed with one of the nose pad mounts. Each nose pad is designated a left-hand nose pad or a right-hand nose pad for attachment to the corresponding temple.

Preferably two ear pieces are included that each have at least one of the second parts of the two-art fastener. In such an embodiment each temple includes at least one of the first parts of the two-part fastener, such that each ear piece is adapted for selectively and manually fixing with one of the temples. Each ear piece is designated a left-hand ear piece or a right-hand ear piece for attachment the corresponding temple. Each ear piece is preferably made from an injection molded plastic material.

Each temple and each ear piece preferably further include a temple pad aperture therethrough, each temple pad aperture of the temple and the ear piece being mutually aligned hen the ear piece is affixed with the temple. Two temple pads are further included that are adapted for insertion through and frictionally engaged with the temple pad apertures of the temples and the ear pieces. As such, the temple pads cushion the person's head while the eyewear system is worn by the person.

The present invention is an eyewear system that allows the user to change the look of the frames periodically with interchangeable parts having a different appearance. The present invention allows the user to swap-out pieces without the need for tools, and further allows for use with custom prescription lenses as well as tinted lenses to reduce glare. The present system is relatively inexpensive to manufacture and intuitive to use. Other features and advantages of the present invention will become apparent from the following more detailed description, taken in conjunction with the accompanying drawings, which illustrate, by way of example, the principles of the invention.

DESCRIPTION OF THE DRAWINGS

FIG. 3A is a cross-sectional view of a preferred embodiment of the invention, taken along lines 3-3 of FIG. a;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
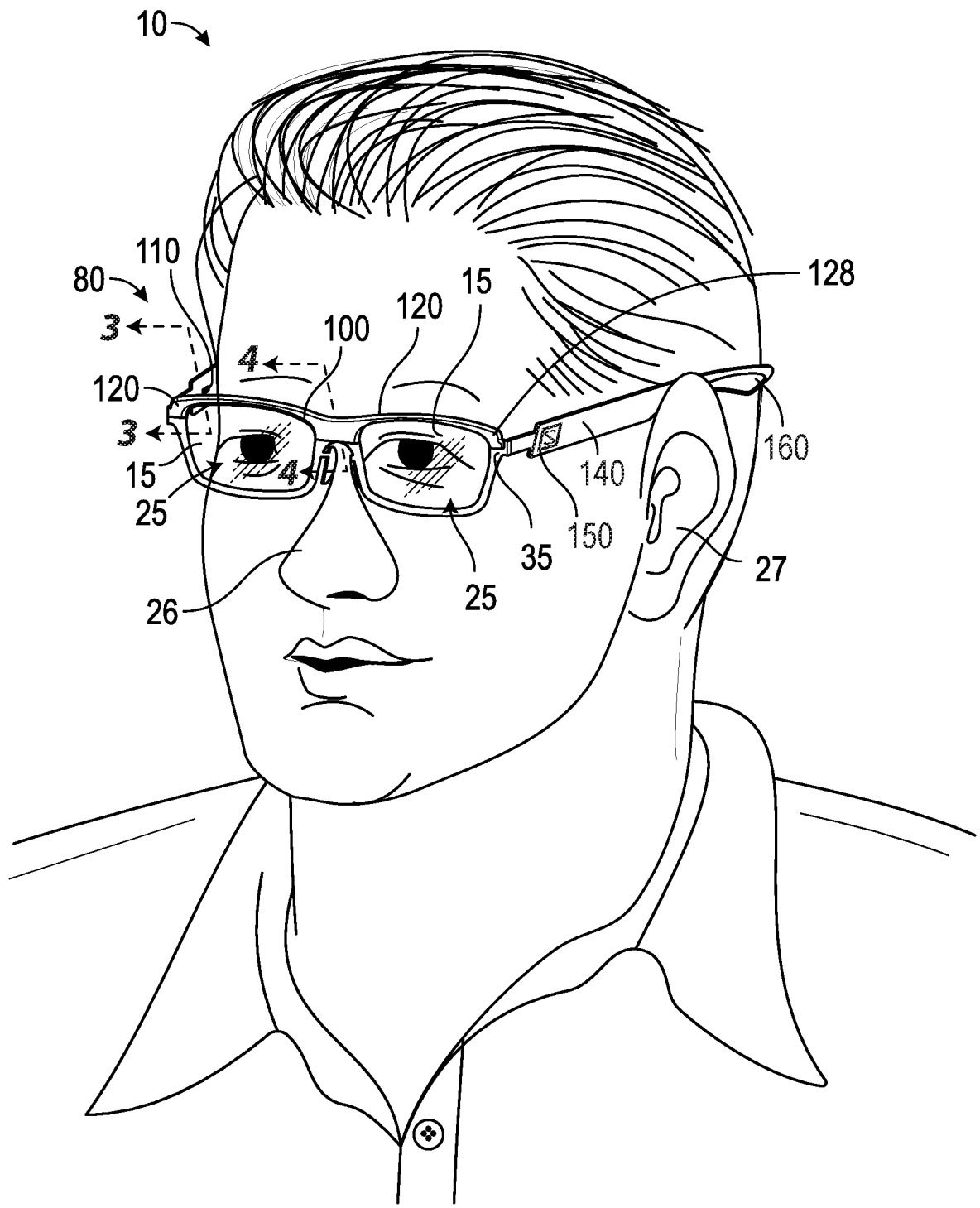
FIG. 1 is a front perspective view of the invention, illustrated as worn in an extended configuration on a person's head.
Figure 2:
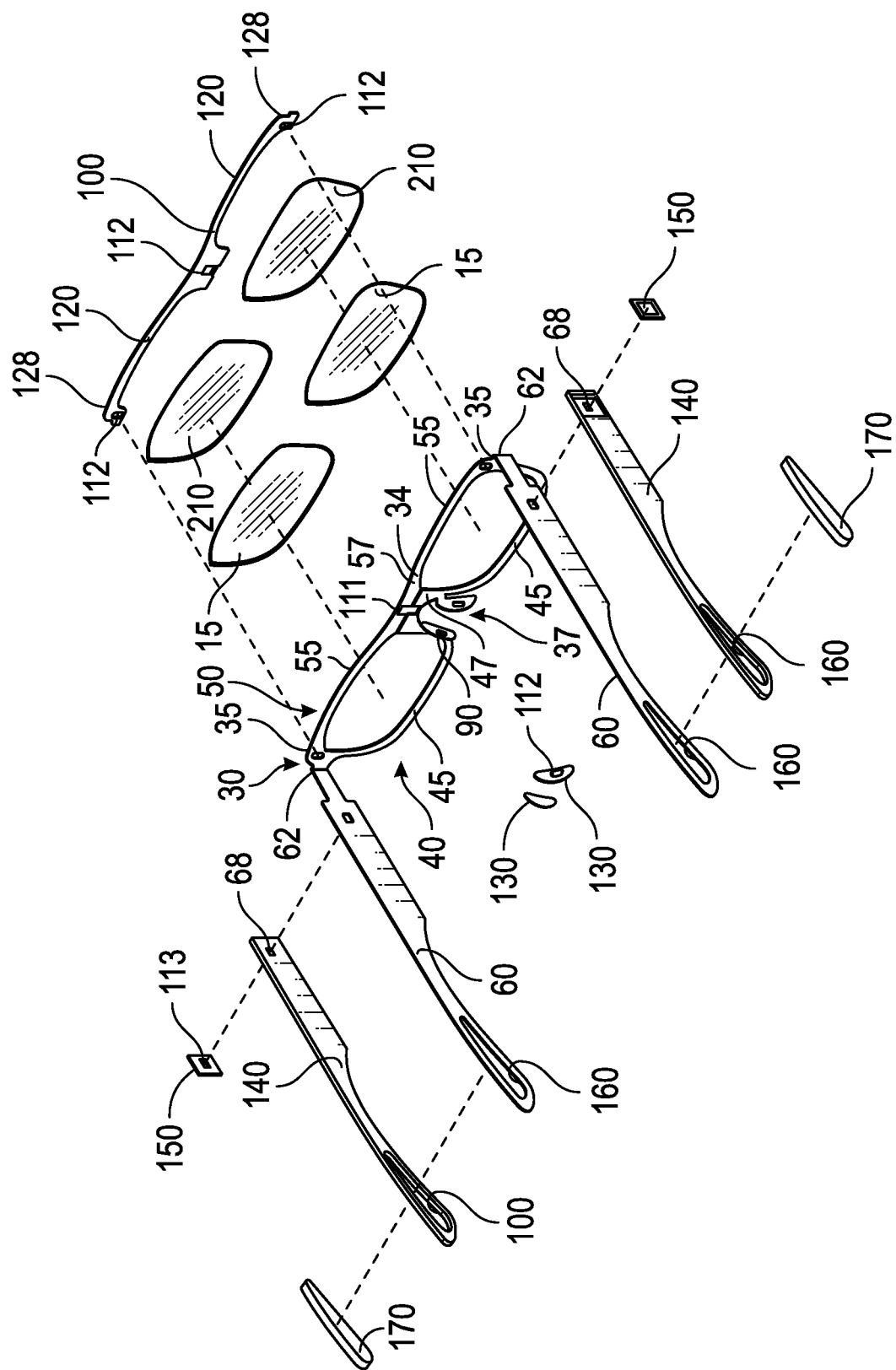
FIG. 2 is a rear exploded perspective view of the invention.

FIGS. 1 and 2 illustrate an eyewear system 10 for supporting two lenses 15 in front of the eyes 25 of a person 20. An alternate embodiment allows for supporting two lenses 15 and two secondary lenses 210, such as tinted sunglass lenses, in front of the eyes 25 of a person 20.

A frame 30 has two opposing ends 35 that are each fixed with a lower frame 40 and an upper frame 50. Each lower frame 40 includes two lower rims 45 mutually affixed at a central lower bridge 47. Each upper frame, similarly, includes two upper rims 55 mutually affixed at a central upper bridge 57. The rims 45,55 are U-shaped in cross-section and adapted to hold an edge of each lens 15. A gap 39 is defined between the upper bridge 57 and the lower bridge 47.

The frame 30 further includes two elongated temples 60, each of which projects rearwardly away from a rear side 37 of the frame 30 at one of the opposing ends 35 of the frame 30. The frame 30 and temples 60 are preferably integrally formed with the temples 60 permanently fixed in an extended configuration 80 (FIG. 1), suitable for wearing by the person 20. The temples 60 do not collapse in the manner of traditional prior art spectacles.

The frame 30 further includes two nose pad mounts 90, each of which projects rearwardly away from one of the lower rims 45 proximate the lower bridge 47. Preferably the frame 30, temples 60, and nose pad mounts 90 are all integrally formed from a rigid material such as a stainless steel sheet.

As such, with the lenses 15 each engaged with one of the lower rims 45 and a corresponding one of the upper rims 55, the lower rims 45 and the upper rims 55 sandwich and retain the lenses 15 therebetween. In some embodiments the secondary lenses 210, such as tinted lenses 210, may also be captured by the upper rims 55 and the lower rims 45 along with the lenses 15, the rims 45,55 in such an embodiment including a section having a double-U-shaped or W-shaped cross section.

A bridge coupler 100 is adapted for selective manual attachment with at least the upper bridge 57 and the lower bridge 47, such that when attached thereto the relative position of the upper bridge 57 and the lower bridge 47 are locked together, thereby maintaining retention of the lenses 15 within the frame 30. As such, the frame 30 can be worn by the person 20 on his nose 26 and ears 27 to hold the lenses 15 in front of his eyes 25, as with conventional spectacles. Preferably the bridge coupler 100 is made from an injection molded elastomeric or plastic material.

Figure 4:
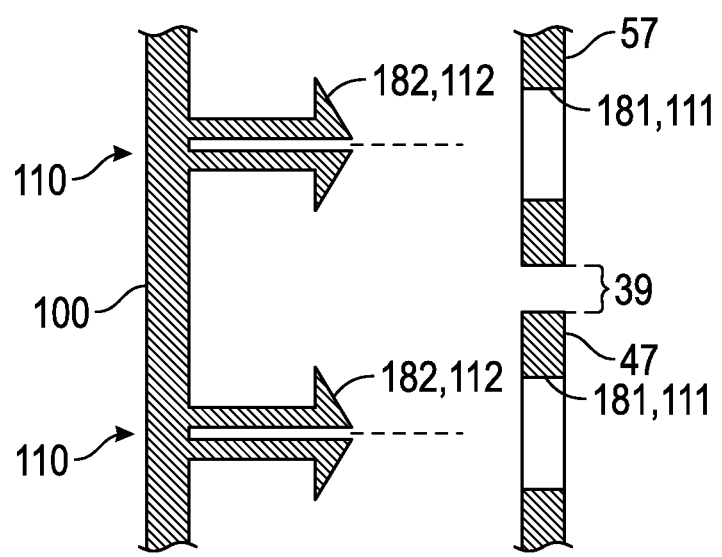
FIG. 4 is a cross-sectional view of a preferred embodiment of the invention, taken along lines 4-4 of FIG. 2.

The upper bridge 57 and the lower bridge 47 each preferably include a first part 111 of a two-part fastener 110 (FIG. 4). The bridge coupler 100, in such an embodiment, includes two second parts 112 of the two-part fastener 110. The first part 111 and the second part 112 of the two-part fasteners 110 are then each brought together manually to affix the bridge coupler 100 to the upper bridge 57 and the lower bridge 47.

Preferably each opposing end 35 of the frame 30 further includes one of the first parts 111 of the two-part fastener 110, and a pair of lens brows 120 extend in opposing directions from the bridge coupler 100 to opposing distal ends 128 each having one of the second parts 112 of the two-part fastener 110. Each distal end 128 of the bridge coupler 100 with the lens brows 120 is thereby adapted for fixing with one of the opposing ends 35 of the frame 30.

Two cushioned nose pads 130 are each adapted for contacting the person's nose 26 and having one of the second parts 112 of the two-part fastener 110. Each nose pad mount 90, in such an embodiment, further includes the first part 111 of the two-part fastener 110, such that each nose pad 130 may be manually affixed with one of the nose pad mounts 90. Each nose pad 130 is designated a left-hand nose pad 131 or a right-hand nose pad 132 for attachment to the corresponding temple 60.

Preferably two ear pieces 140 are included that each have at least one of the second parts 112 of the two-art fastener 110. In such an embodiment each temple 60 includes at least one of the first parts 111 of the two-part fastener 110, such that each ear piece 140 is adapted for selectively and manually fixing with one of the temples 60. Each ear piece 140 is designated a left-hand ear piece 140 or a right-hand ear piece 140 for attachment the corresponding temple 60. Each ear piece 140 is preferably made from an injection molded plastic material.

Figure 3A:
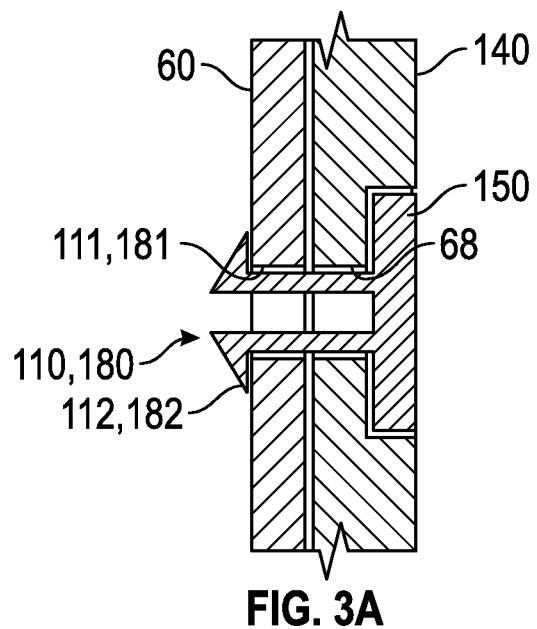

Each ear piece 140 preferably further includes a logo plate 150 that traverses a logo plate aperture 68 of the ear piece 140 and that is selectively attachable to the ear piece 140 and the temple 60 at a forward second part 113 of the two-part fastener 110. The logo plate 150 may rest in an optional recess 69 of the ear piece 140 (FIGS. 3A and 3B), and may be made from an injection molded plastic material, a precious metal, or the like.

Each temple 60 and each ear piece 140 preferably further includes a temple pad aperture 160 therethrough, each temple pad aperture 160 of the temple 60 and the ear piece 140 being mutually aligned hen the ear piece 140 is affixed with the temple 60. Two temple pads 170 are further included that are adapted for insertion through and frictionally engaged with the temple pad apertures 160 of the temples 60 and the ear pieces 140. As such, the temple pads 170 cushion the person's head while the eyewear system 10 is worn by the person 20.

The two-part fastener 110 used on the various components of the eyewear system 10 is preferably a mechanical snap 180 (FIGS. 3A and 4), wherein the first part 111 of the two-part fastener includes an aperture 181 and wherein the second part 112 of the two-part fastener 110 includes a pair of opposing resilient hooks 182 adapted for insertion into the aperture 181 of the first part 111. Alternately the first part 111 may include the opposing resilient hooks 182 and the second part 112 may include the aperture 181.

Figure 3B:
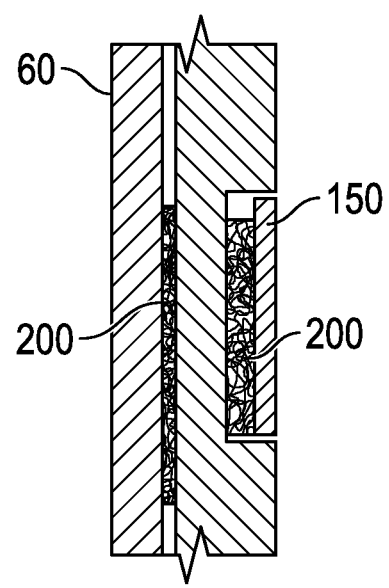
FIG. 3B is a cross-sectional view of an alternate embodiment of the invention, taken along lines 3-3 of FIG. 2.
Figure 3C:
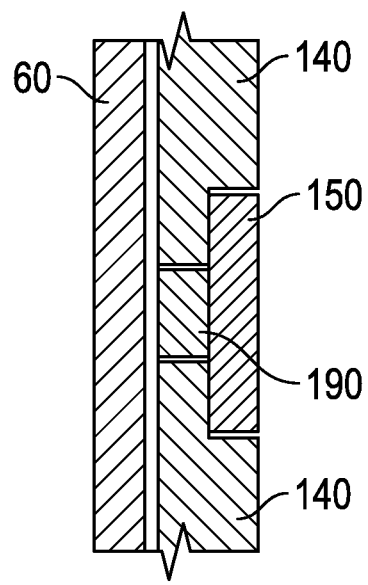
FIG. 3C is a cross-sectional view of another alternate embodiment of the invention, taken along lines 3-3 of FIG. 2.

In some embodiments the two-part fastener 110 includes a magnet 190 and a magnetically-attractive material (FIG. 3C), or two magnets 190. Alternately the two-part fastener 110 includes a hook-and-loop type fastening material 200 (FIG. 3B).

While a particular form of the invention has been illustrated and described, it will be apparent that various modifications can be made without departing from the spirit and scope of the invention. For example, different styles of spectacle frames, temples, ear pieces, nose pads, and the like, may be utilized. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An eyewear system for supporting two lenses in front of the eyes of a person, comprising:
   a frame having two opposing ends each fixed with a lower frame and an upper frame, each lower frame including two lower rims mutually affixed at a central lower bridge, each upper frame including two upper rims mutually affixed at a central upper bridge, a gap being defined between the upper bridge and the lower bridge;
   two elongated temples, each temple projecting rearwardly away from one of the opposing ends of the frame in an extended configuration suitable for wearing by the person;
   two nose pad mounts, each nose pad mount projecting rearwardly away from one of the lower rims proximate the lower bridge; and
   a bridge coupler including a central portion and a pair of elongated lens brows with curved bottom edges, the pair of lens brows extending in opposite directions from the central portion and terminating at opposing distal ends of the bridge coupler, the central portion of the bridge coupler adapted for selective manual attachment directly with at least a front portion of the upper bridge, the central portion of the bridge coupler further adapted for selective manual attachment directly with at least a front portion of the lower bridge, the central portion of the bridge coupler, when attached directly with at least the front portion of the upper bridge and at least the front portion of the lower bridge, preventing widening of the gap between the upper bridge and the lower bridge;
   whereby with one of the lenses engaged with each of the lower rims and the upper rims and with the central portion of the bridge coupler attached directly with at least the front portion of the upper bridge and at least the front portion of the lower bridge, the lower rims and upper rims sandwich and retain the lenses therebetween, the frame being worn by the person on his nose and ears to hold the lenses in front of his eyes.

2. The eyewear system of claim 1 wherein at least the front portion of each of the upper bridge and the lower bridge further includes a first part of a two-part fastener, and wherein at least the central portion of the bridge coupler includes two cooperative second parts of the two-part fastener, whereby the first part and the second part of the two-part fasteners are each brought together manually to attach the central portion of the bridge coupler directly with at least the front portion of the upper bridge and at least the front portion of the lower bridge.

3. The eyewear system of claim 2 wherein each opposing end of the frame further includes one of the first parts of the two-part fastener, and wherein each opposing distal end of the bridge coupler each having includes one of the second parts of the two-part fastener, each opposing distal end of the bridge coupler adapted for fixing with one of the opposing ends of the frame.

4. The eyewear system of claim 2 further including two nose pads each adapted for contacting the person's nose and having one of the second parts of the two-part fastener, and wherein each nose pad mount further includes the first part of the two-part fastener, whereby each nose pad may be manually affixed with one of the nose pad mounts.

5. The eyewear system of claim 2 further including two ear pieces each having at least one of the second parts of the two-part fastener, and wherein each temple includes at least one of the first parts of the two-part fastener, whereby each ear piece is adapted for selectively and manually fixing with one of the temples.

6. The eyewear system of claim 5 wherein a forward second part of the two-part fastener of each ear piece includes a logo plate that traverses a logo plate aperture of the ear piece and that is selectively attachable to the ear piece and the temple.

7. The eyewear system of claim 5 wherein each temple and each ear piece further include a temple pad aperture therethrough, each temple pad aperture of the temple and ear piece being mutually aligned when the ear piece is affixed with the temple, two temple pads being further included, each adapted for insertion through and frictional engagement with the temple pad apertures of one of the temples and ear pieces and for cushioning the person's head while worn by the person.

8. The eyewear system of claim 2 wherein the two-part fastener is a mechanical snap, wherein the first part of the two-part fastener includes an aperture and wherein the second part of the two-part fastener includes a pair of opposing resilient hooks adapted for insertion into the aperture of the first part of the two-part fastener.

9. The eyewear system of claim 2 wherein the two-part fastener is a mechanical snap, wherein the second part of the two-part fastener includes an aperture and wherein the first part of the two-part fastener includes a pair of opposing resilient hooks adapted for insertion into the aperture of the second part of the two-part fastener.

10. The eyewear system of claim 2 wherein the two-part fastener includes at least one magnet and a magnetically attractive material.

11. The eyewear system of claim 2 wherein the two-part fastener includes a hook-and-loop type fastening material.

12. The eyewear system of claim 1 further including two secondary lenses, the lower rims and upper rims adapted to retain either the lenses or the lenses and the secondary lenses when the central portion of the bridge coupler is attached directly with at least the front portion of the upper bridge and at least the front portion of the lower bridge.

13. The eyewear system of claim 1 wherein the frame, temples, and nose pad mounts are integrally formed from a substantially rigid material.

14. The eyewear system of claim 13 wherein the frame, temples, and nose pad mounts are integrally formed from a stainless steel plate material, the temples bent into the extended configuration during manufacturing of the eyewear system.

15. An eyewear system for supporting two lenses in front of the eyes of a person, comprising:
a frame having two opposing ends each fixed with a lower frame and an upper frame, each lower frame including two lower rims mutually affixed at a central lower bridge, each upper frame including two upper rims mutually affixed at a central upper bridge, the lower bridge including an aperture formed therein that extends through at least front and rear surfaces of the lower bridge, the upper bridge including an aperture formed therein that extends through at least front and rear surfaces of the upper bridge, a gap being defined between the upper bridge and the lower bridge;
two elongated temples, each temple projecting rearwardly away from one of the opposing ends of the frame in an extended configuration suitable for wearing by the person;
two nose pad mounts, each nose pad mount projecting rearwardly away from one of the lower rims proximate the lower bridge; and
a bridge coupler including first and second fastener parts protruding therefrom, the bridge coupler adapted for selective manual attachment with at least the upper bridge by way of the first fastener part engaging the aperture formed in the upper bridge, the bridge coupler further adapted for selective manual attachment with at least the lower bridge by way of the second fastener part engaging the aperture formed in the lower bridge, the bridge coupler, when attached with the upper bridge and the lower bridge, preventing widening of the gap between the upper bridge and the lower bridge;
whereby with one of the lenses engaged with each of the lower rims and the upper rims and with the bridge coupler attached with the upper bridge and the lower bridge, the lower rims and upper rims sandwich and retain the lenses therebetween, the frame being worn by the person on their nose and ears to hold the lenses in front of their eyes.

16. An eyewear system for supporting two lenses in front of the eyes of a person, comprising:
a frame having two opposing ends each fixed with a lower frame and an upper frame, each lower frame including two lower rims mutually affixed at a central lower bridge, each upper frame including two upper rims mutually affixed at a central upper bridge, the lower bridge including an aperture formed therein that extends through at least front and rear surfaces of the lower bridge, the upper bridge including an aperture formed therein that extends through at least front and rear surfaces of the upper bridge, a gap being defined between the upper bridge and the lower bridge;
two elongated temples, each temple projecting rearwardly away from one of the opposing ends of the frame in an extended configuration suitable for wearing by the person;
two nose pad mounts, each nose pad mount projecting rearwardly away from one of the lower rims proximate the lower bridge; and
a bridge coupler including a pair of elongated lens brows extending in opposite directions from a central portion of the bridge coupler and terminating at opposing distal ends of the bridge coupler, the bridge coupler further including first and second fastener parts protruding from the central portion, the bridge coupler adapted for selective manual attachment with at least the upper bridge by way of the first fastener part engaging the aperture formed in the upper bridge, the bridge coupler further adapted for selective manual attachment with at least the lower bridge by way of the second fastener part engaging the aperture formed in the lower bridge, the bridge coupler, when attached with the upper bridge and the lower bridge, preventing widening of the gap between the upper bridge and the lower bridge;

whereby with one of the lenses engaged with each of the lower rims and the upper rims and with the bridge coupler attached with the upper bridge and the lower bridge, the lower rims and upper rims sandwich and retain the lenses therebetween, the frame being worn by the person on their nose and ears to hold the lenses in front of their eyes.

\* \* \* \* \*

UNITED STATES PATENT AND TRADEMARK OFFICE
CERTIFICATE OF CORRECTION

PATENT NO. : 10,962,800 B1
APPLICATION NO. : 16/255791
DATED : March 30, 2021
INVENTOR(S) : Mikich et al.

Page 1 of 1

It is certified that error appears in the above-identified patent and that said Letters Patent is hereby corrected as shown below:

In the Claims

1. In Column 6, Line 67, Claim 3, after "coupler" delete "each having".

Signed and Sealed this
Sixteenth Day of August, 2022

Katherine Kelly Vidal
*Director of the United States Patent and Trademark Office*